C. E. DERR.
GEAR MANUFACTURE.
APPLICATION FILED OCT. 11, 1912.

1,330,521.

Patented Feb. 10, 1920.
5 SHEETS—SHEET 1.

WITNESSES
C. S. Brown.
B. M. Kent

INVENTOR
C. E. Derr
By Enter, Freeman, Watson & Coit,
Attorneys

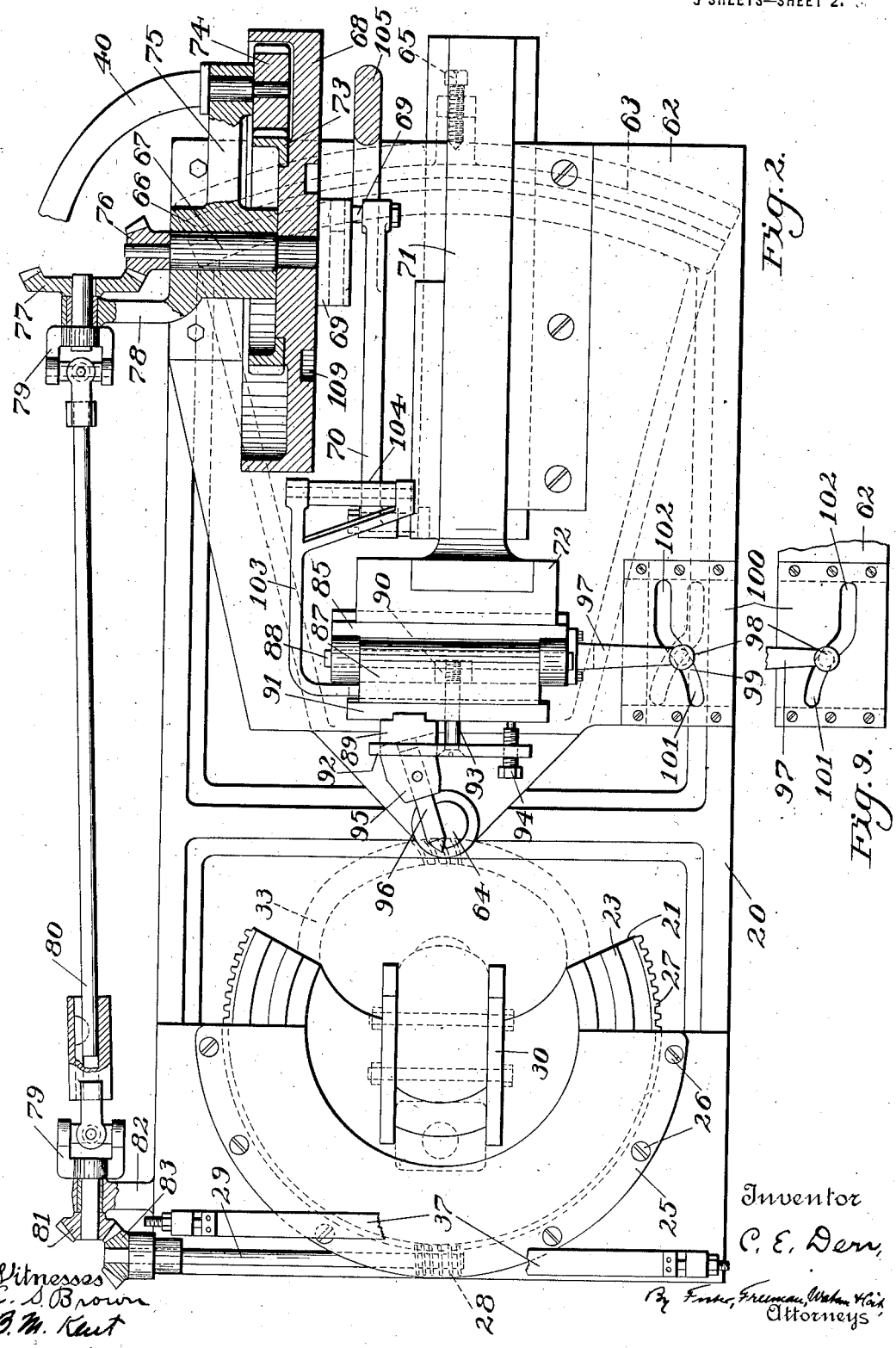

C. E. DERR.
GEAR MANUFACTURE.
APPLICATION FILED OCT. 11, 1912.
1,330,521.
Patented Feb. 10, 1920.
5 SHEETS—SHEET 3.
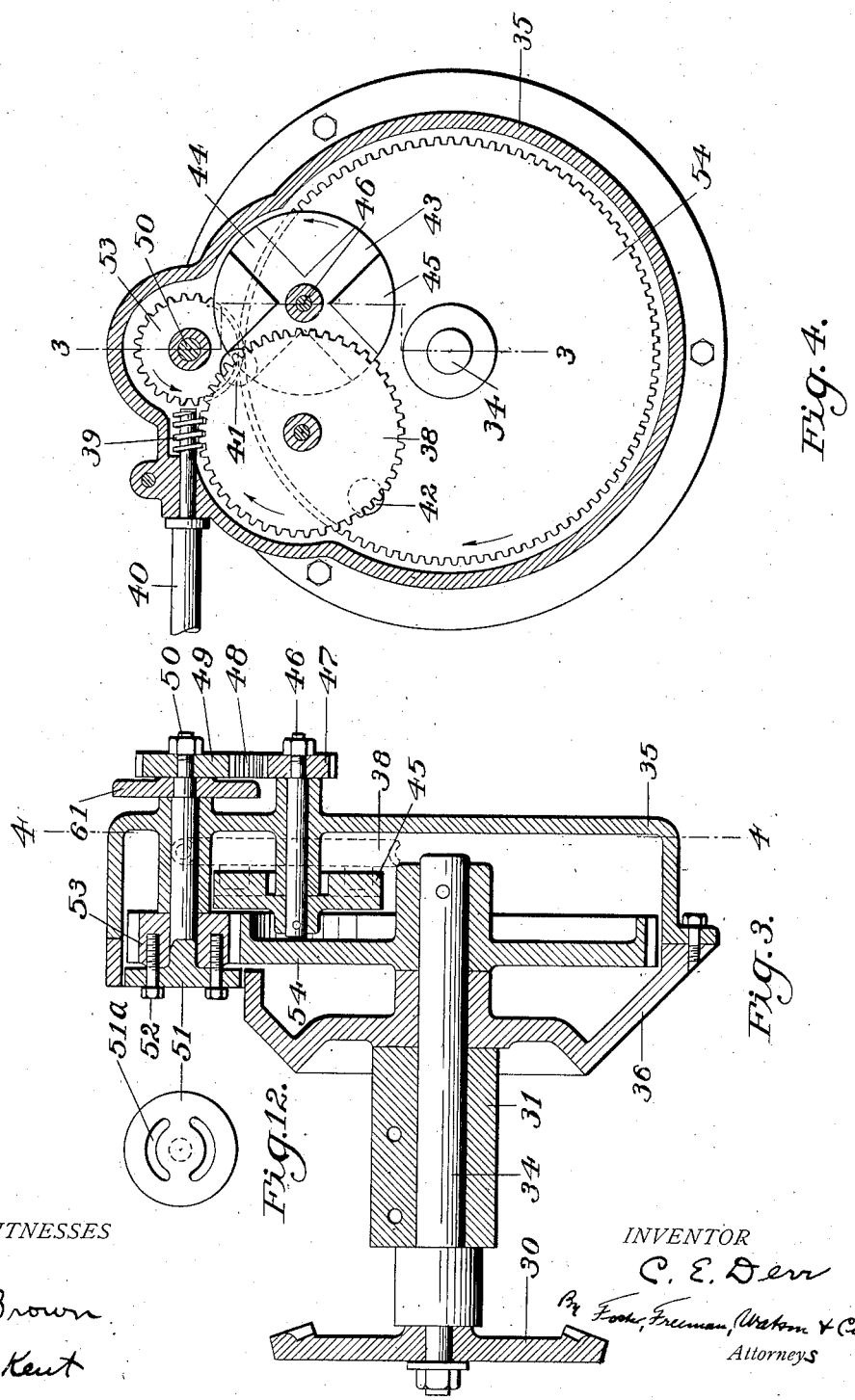
WITNESSES
C. S. Brown
B. M. Kent
INVENTOR
C. E. Derr
By Foote, Freeman, Watson & Cox,
Attorneys

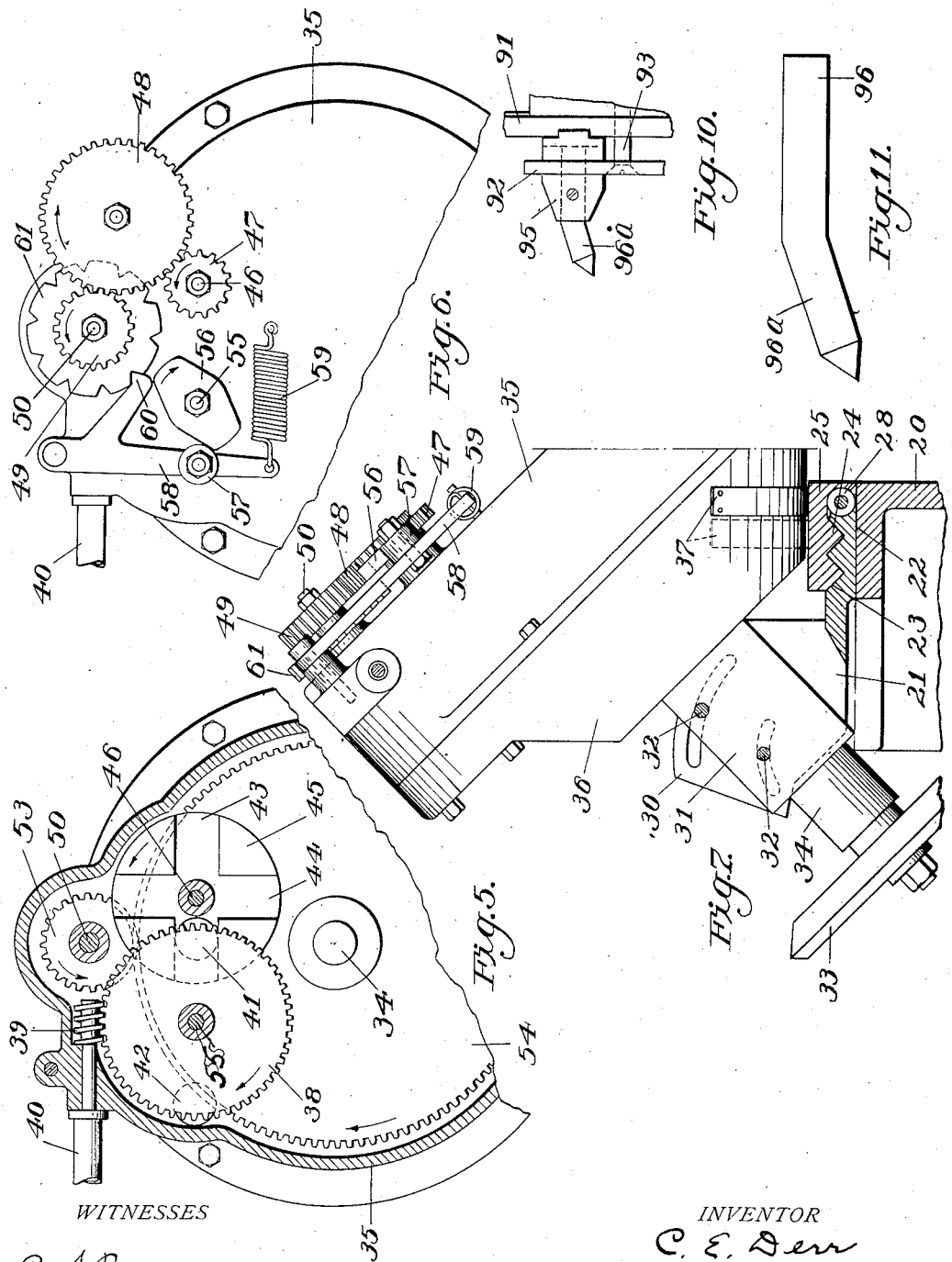

C. E. DERR.
GEAR MANUFACTURE.
APPLICATION FILED OCT. 11, 1912.
1,330,521.
Patented Feb. 10, 1920.
5 SHEETS—SHEET 5.
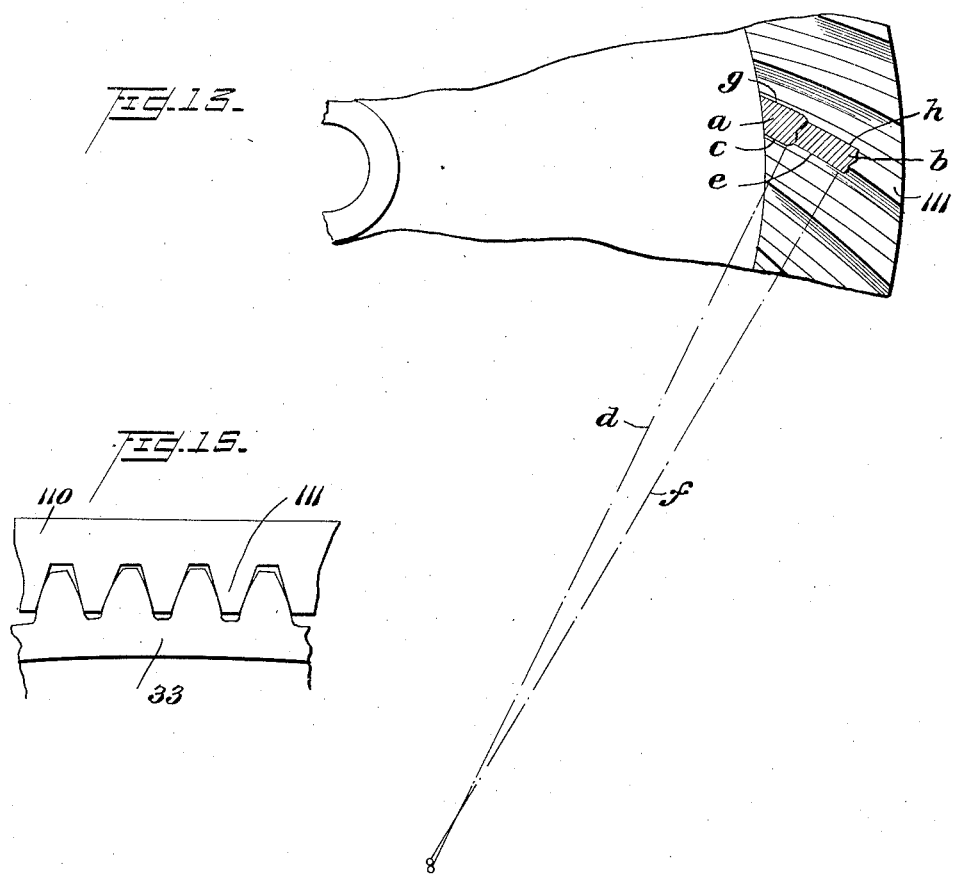
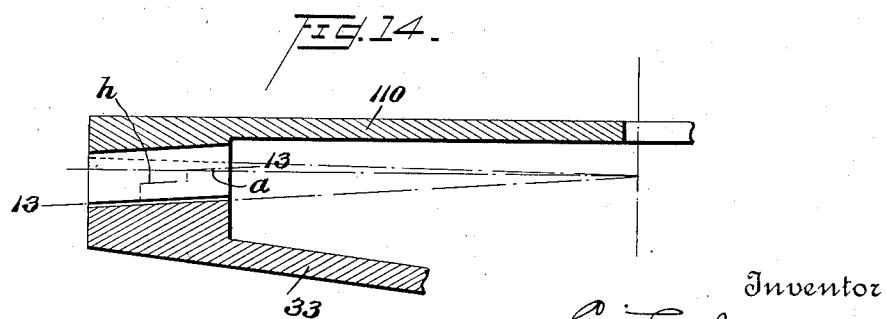
Inventor
C. E. Derr,
By Foster, Freeman, Watson & Coit,
Attorneys

UNITED STATES PATENT OFFICE.

CHARLES E. DERR, OF DETROIT, MICHIGAN, ASSIGNOR, BY MESNE ASSIGNMENTS, TO JAMES E. GLEASON, TRUSTEE, OF ROCHESTER, NEW YORK.

GEAR MANUFACTURE.

1,330,521.　　　　　　　Specification of Letters Patent.　　Patented Feb. 10, 1920.

Application filed October 11, 1912.　Serial No. 725,328.

*To all whom it may concern:*

Be it known that I, CHARLES E. DERR, a citizen of the United States, and resident of Detroit, Wayne county, State of Michigan, have invented certain new and useful Improvements in Gear Manufacture, of which the following is a specification.

This invention relates to gear manufacture and more particularly to a method of cutting gears having curved teeth, and to machines for carrying out my method.

One form of machine for carrying out my method is shown in the accompanying drawings and hereinafter described, this machine embodying improvements in the type of machine described in Patents Nos. 294,844, dated March 11, 1884, and 665,054, dated January 1, 1901. Both of said patents relate to machines for cutting gears of the bevel type, on what is called in the earlier of said patents the "principle of evolution." These patents, however, are limited to the theory of, and machines for, cutting bevel gears having straight teeth, as distinguished from bevel gears having curved or irregularly shaped teeth.

In the drawings

Fig. 2 is a plan view, partly in section with some of the parts removed, and with the gear blank and its arbor shown in dotted lines;

Fig. 3 is a section through the blank-arbor bearing and spacing head on the line 3—3 of Fig. 4;

Fig. 4 is a section through the spacing head on the line 4—4 of Fig. 3;

Fig. 5 is a similar section, showing the working parts in a different position;

Fig. 6 is a top view of the spacing head corresponding to the sections shown in Figs. 4 and 5;

Fig. 7 is an elevation of the spacing head shown in Fig. 1, taken from the other side of the head;

Fig. 8 is a vertical section through the head and tool support, and showing the tool in raised position;

Fig. 9 is a fragmentary plan view, showing the cam plate in reverse position;

Figs. 10 and 11 are detail views of a modified form of tool and tool holder; and Fig. 12 is an end view of an arbor flange;

Fig. 13 is a plan of a segment of a crown gear having teeth which are conjugate to the teeth of the gear shown in Fig. 1, the teeth of the crown gear being sectioned on line 13—13 of Fig. 14;

Fig. 14 is a section of the crown wheel shown in Fig. 13 and an intermeshing bevel wheel;

Fig. 15 is a side view of parts shown in Fig. 14.

Figure 1:
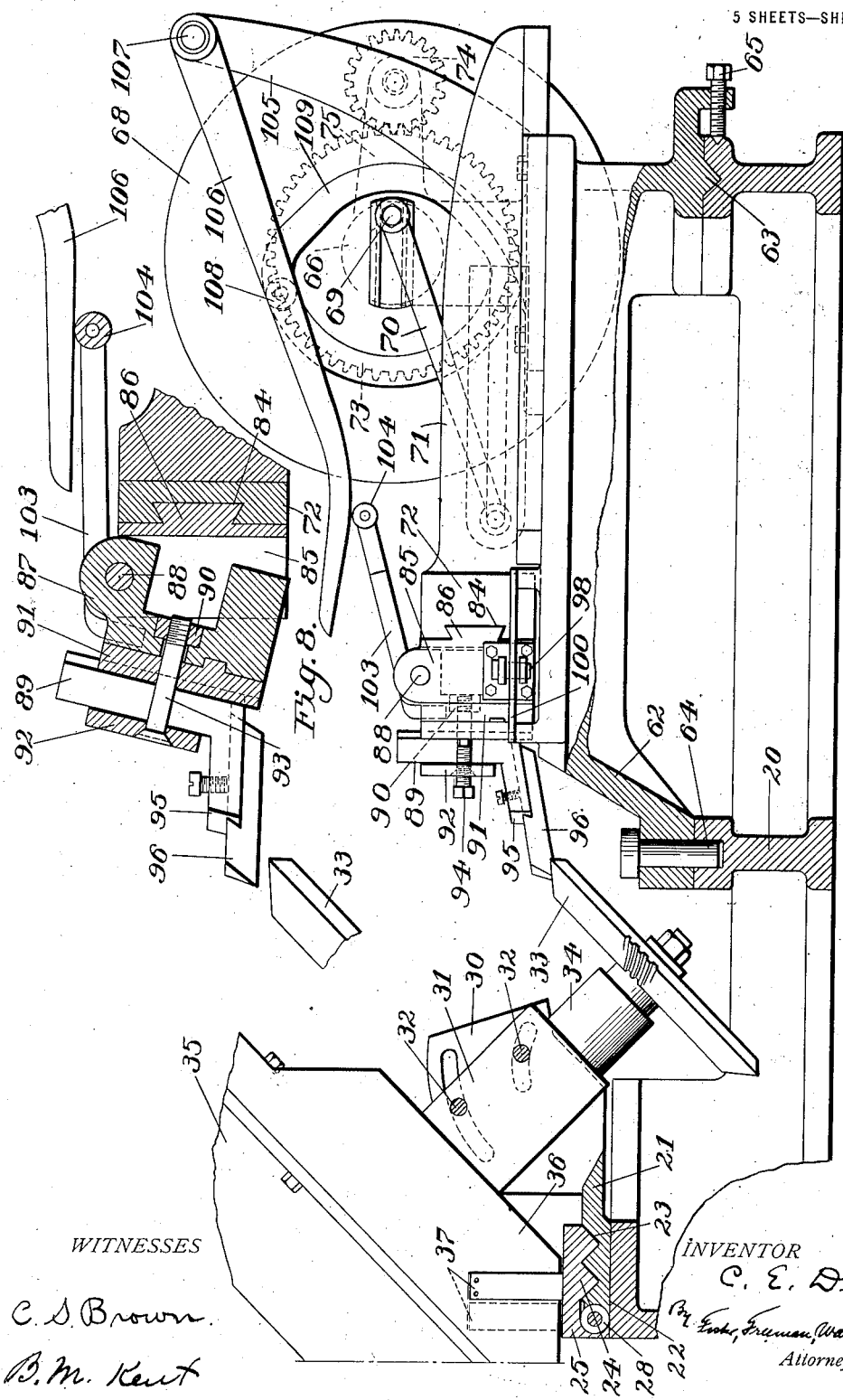
Figure 1 is a side elevation, partly in section of the improved machine.

The method consists, in substance, in moving a tool, such as herein shown, in a curved path to shape the tooth, and simultaneously or coöperatively producing a relative motion between the blank and the tool to generate the tooth.

Referring to the drawings, in the machine herein shown for carrying out this method, the frame or bed of the machine is indicated at 20, and upon the left end of the frame, as shown in Fig. 1, is mounted the means for supporting and operating the gear blank. This supporting means consists principally of a plate 21 mounted upon a flat upper surface 22 of the frame, and having a series of circular grooves 23 in which fit the corresponding circular flanges 24 of a securing plate 25, which is fastened to the frame by the screws 26. The circumference of the plate 21 is formed with gear teeth 27, with which meshes a worm 28 driven by a shaft 29, whereby the plate 21 is rotated or oscillated about a vertical axis which passes through the apex of the former-cone, hereinafter described.

The plate 21 carries two uprights 30 between which is adjustably held a block or bearing 31, as by bolts 32. Thus this bearing is adjustable about the apex of the former-cone for operation upon different sized gears or blanks.

The blank 33 is removably clamped to the arbor 34 which operates in the bearing 31, and upon the upper end of the arbor is rotatably mounted the housing 35 of the spacing head, the lower part of this housing comprising the former-cone 36, which is a production of the pitch cone of the blank 33. By means of two steel bands 37, each of which has one end attached to the cone 36 and the other to the body of the machine in such a way that one band prevents the slipping of the cone in one direction and the other in the other direction, the said cone is so held that when the grooved plate 21 is oscillated, the cone will assume a motion as of a cone rolling on a plane without slip. If the housing 35, of which the said cone is a part, were coupled to the blank arbor 34, this rolling motion would be transmitted to the blank 33, thereby imparting to the latter that motion which is necessary to cause the tool to generate the proper tooth contour.

As a matter of fact, however, the housing 35 is only intermittently coupled to the arbor 34—namely, during the forward stroke of the tool. During the return stroke of the tool, the blank arbor is rotated in relation to the housing 35 through the distance, preferably of one tooth of the blank 33. This intermittent rotation is accomplished as follows: Within the housing 35 is rotatably mounted a worm wheel 38, shown in full lines in Figs. 4 and 5 and in dotted lines in Fig. 3, which worm wheel is driven by means of a worm 39, operated by a flexible shaft 40 (see Figs. 2 and 5) from the tool operating mechanism in timed relation with the tool, so that the worm wheel 38 will make one-half of a revolution for every full forward and back movement of the tool.

The face of the worm wheel 38 is provided with two rollers 41 and 42, which engage with two grooves 43 and 44, planed at right angles to each other, into the face of a wheel 45. When the worm wheel 38 is in the position shown in Fig. 4, the roller 41 enters the groove 43 and imparts to the wheel 45 a rotary movement of an accelerating nature. After the worm wheel has completed one-eighth of a rotation and assumed the position shown in Fig. 5, it will have imparted to wheel 45 one-eighth of a revolution, and the rate of motion or speed of the wheel 45 will have reached its maximum. As the worm wheel 38 completes another one-eighth of a revolution, the movement imparted to the wheel 45 will be of a retarding nature, and the groove 43 of the wheel 45 will arrive at the position which the groove 44 assumes in Fig. 4, the roller 41 leaving the groove at this time. During the next quarter turn of the worm wheel 38, the wheel 45 will remain stationary until the first semi-revolution of the worm wheel has been completed and the rollers 41 and 42 have exchanged their positions. The roller 42 will then enter the groove 44, which will then be in the position occupied by the roller 41 and the groove 43 of Fig. 4, and the process described above will be repeated. In this way, an intermittent motion is imparted to the wheel 45, which is so timed that a quarter rotation occurs during the return stroke of the cutting tool, while the wheel 45 will remain at rest during the forward stroke of said tool. The wheel 45 is secured to an arbor 46, to which is clamped a change-wheel 47. This wheel is geared through an idler 48 to the change-wheel 49, which is clamped to an arbor 50. This arbor carries a flange 51, provided with arc shaped slots $51^a$, shown in Fig. 12. By means of bolts 52 which pass through said slots, the spacing pinion 53 is adjustably secured to the arbor 50. This pinion engages with the master wheel 54, which is secured to the blank arbor 34. Thus the train of gears just described connects the groove wheel 45 with the blank arbor 34. The change-gears are so selected that for each quarter revolution of the wheel 45, the blank 33 is rotated through the space of one tooth.

For holding the blank firmly during the forward stroke of the tool, an anchor is provided as follows:—To the arbor 55 of the worm wheel 38, is secured a cam 56, Fig. 6, which engages with the cam roller 57 of the anchor lever 58, the spring 59 holding the roller in contact with the cam. The lever 58 carries the anchor-toe 60, engaging with the notched anchor-wheel 61, which is clamped to the pinion arbor 50. The cam 56 is so timed that the wheel 61 will be anchored during the forward stroke of the tool and released during the return stroke, these strokes of the tool being more fully hereinafter described.

Upon the right hand end of the frame 20, as shown in Fig. 1 of the drawings, the mechanism for operating the cutting tool is mounted. The base or support 62 of this mechanism is shown as resting on the frame in a circular groove or runway 63, and may thus be moved about the axis of a pin 64, which is adjacent the lower end of the blank arbor 34, and which forms a connection between the support 62 and the frame 20. The support may be secured in its adjusted position by means of a set screw 65, and in the drawings it is shown as secured in its center position. This support may, if desired, be an integral part of the frame 20, and is made adjustable principally for the purpose of cutting teeth of wide angularity. Upon the support 62 is a bearing 66 for an arbor 67, which carries a driving pulley 68, having an adjustable crank 69 thereon. By means of a connecting rod 70, this crank is connected with the ram 71 having a tool operating head 72 at its forward end.

For operating the mechanism at the left-hand end of the frame by the driving pulley 68 at the right hand end, the following flexible mechanism is provided:—The driving pulley 68 carries a gear wheel 73 which engages with a pinion 74 mounted in an arm 75 extending from the bearing 66. This pinion 74 is coupled to one end of the flexible shaft 40, through which the worm wheel 38 is driven, as hereinabove described. The pulley-arbor 67 also carries a bevel pinion 76, which meshes with a bevel wheel 77 mounted in an arm 78 also extending from the bearing 66. The wheel 77 is connected through universal joints 79, and an extensible shaft 80 with a bevel gear 81 mounted in an arm 82 at the left hand end of the frame 20. The gear 81 meshes with a bevel gear 83, which is secured to the end of the shaft 29, which rotates the worm 28 for operating the feeding mechanism for rolling the blank on its pitch surface during the cutting operation, as hereinabove described.

It will of course be understood that the ram 71 slides longitudinally in suitable ways in the support 62, and, if the tool 96 were secured directly to the ram as in said Patent 294,844, the line of motion of the tool would be parallel to a line on the bottom surface of the tooth spaces of the gear being cut, as described in lines 60—64 of page 2 of said patent and shown in Fig. 4 thereof. The tool operating head 72 is formed with a horizontal dove-tail groove 84, and a tool support 85 has a dove-tail 86 fitting said groove, whereby the tool support may slide transversely of the longitudinal axis of the ram. An apron 87 is pivoted on the support 85 by a pin 88, and a tool holder 89 is adjustably secured to the front face of the apron. The securing means for the tool holder comprises a block 90 sliding in a groove in the apron, and a pair of clamping plates 91 and 92 between which the tool holder 89 is held by bolts 93 and 94. In the forwardly projecting arm 95 of the tool holder 89, is secured a tool or cutter 96, the arm 95 shown in Figs. 1 and 2 being bent at a slight angle to the longitudinal axis of the ram 71, so that the tool is secured in said tool holder also at an angle to said axis. This arrangement is shown particularly in Fig. 2.

The tool support 85 is connected with means for sliding it transversely of the longitudinal axis of the ram 71 simultaneously with the reciprocation of said ram. As shown in the drawings, this means consists of an arm 97 secured to the tool support 85, as shown in Figs. 1 and 2, and having a pin or roller 98 adapted to operate in a cam slot 99 in a cam plate 100, which is secured preferably to the support 62 or other part of the machine frame. The cam slot 99 may be of any desired shape, but for the purpose of cutting curved teeth, said slot is curved where it operates during the cutting part of the tool stroke, and thus produces a varying relative lateral movement between the tool and blank. The slot may be straight or parallel with the longitudinal axis of the ram 71 during the idle part of said stroke. This curved part of the slot is shown at 101, and the straight part at 102, and in the drawings the curved part is made in the form of an arc of a true circle.

From the above description it will be seen that as the ram 71 reciprocates through the medium of the connecting rod 70 and crank 69, the head 72 is carried with it, and the tool support 85 in moving forwardly is guided by the cam slot 99, and caused to slide transversely in the head 72 simultaneously with its forward movement. This combined forward and lateral movement of the tool, in the present form or embodiment of the invention as adapted to the machine of the aforesaid Bilgram Patent No. 294,844, will be in a plane parallel to one which is tangential to the dedendum cone of the gear being cut. On the return stroke of the ram, the tool support 85 is of course caused to reverse its sliding movement in the head 72, and the parts are returned to initial position. Thus there is illustrated one form of mechanism for giving to the tool a movement in a curved path across the face of the blank, and in this mechanism the tool support 85 and all the parts thereon, including the tool 96, have a translatory movement in a curved path, the tool cutting a curved space between the teeth, instead of a straight one, as it would do without the cam and slide mechanism. The angular position of the tool takes care of the necessary clearances. When the curved part 101 of the cam slot is made, as in the drawings, on an arc of a true circle and the gear blank is rolled upon its pitch surface during the cutting operation as above described, the tool which is in the well-known form of a rack tooth travels in a similar arc and a gear is cut, as shown, having curved teeth extending in a generally diagonal direction and formed by a rack tooth passing in a circular path which is parallel to a plane tangential to the dedendum cone of the gear.

Hence the faces of the gear teeth are conjugate to surfaces each of which is generated by the motion of a straight line guided by true circular arcs which lie in planes parallel to a plane tangential to the dedendum cone of the gear. This is clearly shown in Figs. 13 to 15 in which the gear 33 is shown as meshing with the crown gear 110 having teeth each of the faces of which is a surface generated as above described. The tooth 111 is cut away at $a$ and $b$ on planes which are parallel to a plane tangential to the dedendum cone of the gear 33. The intersection of the surface $a$ with one face of the tooth 111 is the circular arc $c$ having the radius $d$ and the intersection of the surface $b$ with the same face of the tooth is the circular arc $e$ having the radius $f$. The face of the tooth is a surface generated by a straight line having a translatory movement and guided by the arcs $c$ and $e$. The opposite face of the tooth 111 is a surface generated by a line having a translatory movement and guided by the arcs $g$ and $h$.

It is desirable to raise the tool during its return stroke so that the blank may be rotated for a cut on the next tooth, and for this purpose the apron 87 is provided with an offset arm 103, on the end of which is mounted a long roller 104. An arm 105 extending from the support 62 has a lever 106 pivoted at 107, and said lever is provided with a roller 108, which operates in an irregular cam slot 109 in the face of the pulley 68, so that the forward end of the lever 106 depresses the arm 103 as it contacts with the roller 104. The roller is made sufficiently long to be operated upon by the lever 106 at any time during the transverse reciprocation of the tool support 85. By the action of this lever 106, the tool is alternately raised and lowered, the cam slot 109 being so timed that the tool will be raised during the return stroke and will be in its normal cutting position during its forward stroke. The tool and apron are shown in cutting position in Fig. 1, and in raised position as they would appear on the return stroke in Fig. 8. The tool is moved through the blank a sufficient distance before it is raised to insure clearance.

In a pair of bevel gears the teeth of one gear are of course curved in the opposite direction to the teeth of the other. Therefore, by making the cam plate 100 reversible, so that it may be used, as shown in Fig. 2, for cutting one of the gears of a pair, and then reversed, as shown in Fig. 9, for cutting the other gear of said pair, only one cam is required for cutting two gears. As it is necessary that these gears should be cut extremely accurately, this reversibility of the cam plate is of considerable importance, because in the first place, it means that the gears will be cut to a much better fit than as if two separate cams were used, and that the expense for cam plates will be less.

In Figs. 10 and 11 another form of tool and tool holder is shown. In this instance, the forwardly projecting arm 95 of the tool holder is straight instead of being at an angle, and the tool 96 has its forward end 96ᵃ bent at an angle, so that the proper clearance is obtained in cutting a curved tooth.

The operation of the machine may be described as follows: When the pulley 68 is put in motion, a reciprocating movement is transmitted to the ram 71 and the head 72, and all of the parts mounted thereon are caused to reciprocate with the ram. By reason of the cam slot 99 guiding the pin 98, the tool support 85 is caused to reciprocate transversely of the longitudinal axis of the ram 71, and the tool 96 therefore travels in a curved path across the face of the gear blank 33. During the return stroke, the tool is raised to clear the teeth of the blank and for the purpose of allowing plenty of time for the blank to be rotated to the next tooth, the tool 96 travels some distance away from the blank toward the rear, and during this part of its movement the pin 98 travels in the portion 102 of the cam slot 99. At the beginning of the operation, the blank is so far to one side that the tool will make only a light cut into it. By the spacing mechanism described, the blank is rotated during each return stroke of the tool through the distance of one tooth, so that the tool at each consecutive stroke will make this light cut into that part of the blank out of which the next adjoining tooth space is to be cut. At the same time, the feeding movement through the worm 28 and plate 21 progresses slowly, so that each following cut will be slightly deeper than the one preceding, and that after the blank has made one revolution and the tool has made the first cut into each space of the blank, the tool will make a second cut into the first space somewhat deeper than the first cut. This process will continue until the rolling motion of the blank has proceeded so far that the tool ceases to cut.

In order to obtain the convergent space peculiar to bevel gearing, both the tool and the blank are then readjusted for the second operation, similar to that described, the first operation having correctly generated only one side of each tooth space of the blank. The readjustment of the tool may be accomplished by reclamping, while the readjustment of the blank may be effected by loosening the bolts 52, slightly turning the pinion 53 on its arbor 50, and reclamping the bolts.

For cutting the mate to the first gear, if the gear sizes are equal, it is only necessary to substitute another blank, reverse the cam plate 100, and reverse the angle of the tool. Of course if the mating gears are of unequal diameter, it is then necessary to also change the angle of the blank arbor 34 and the ratio of the change-wheels 47 and 49.

Having thus described my invention, what I claim and desire to obtain by Letters Patent, is:

1. In a gear cutting machine, the combination with means for holding the blank, a cutter, and means for rolling the blank relative to the cutter to generate the tooth, of means for giving to the cutter a translatory movement back and forth in a curved path across the face of the blank.

2. In a machine for cutting bevel gears, the combination with means for holding the blank, a cutter, and means for rolling the blank on its pitch cone surface relative to the cutter to generate the tooth, of means for operating the cutter back and forth in a curved path across the face of the blank, the general direction of movement of said cutter being at an angle to an element of the pitch cone.

3. In a machine for cutting bevel gears, the combination with means for holding a bevel gear blank, of a tool operating head mounted to reciprocate substantially in a plane across the face of the blank, a tool operated by said head, means for rolling the blank on its pitch cone surface relative to the tool to generate the tooth, means for causing with each reciprocation of said head a relative movement between said tool and said blank holding means transversely of the path of reciprocation of said head, means for producing an intermittent rotation of the blank to cause the tool to cut on successive teeth, and means for holding the blank against all rotation on its axis, except that due to said rolling means, during the cutting operation.

4. In a gear cutting machine, the combination with means for holding the blank, of a tool operating head mounted to reciprocate substantially in a plane across the face of the blank, a tool support mounted to slide in the head, means for reciprocating the head, and means for simultaneously sliding the tool support.

5. In a gear cutting machine, the combination with means for holding the blank, of a tool operating head mounted to reciprocate substantially in a plane across the face of the blank, a tool support mounted to slide transversely in the head, means for reciprocating the head, and means for sliding the tool support in time with the reciprocating movement of the head.

6. In a gear cutting machine, the combination with means for holding the blank, of a tool operating head mounted to reciprocate toward and from the blank, a tool support mounted to slide in the head, means for reciprocating the head, and a cam for sliding the tool support transversely as it is moved toward the blank by the head.

7. In a gear cutting machine, the combination with means for holding the blank, of a tool operating head mounted to reciprocate toward and from the blank, a tool support mounted to slide in the head, means for reciprocating the head, means for simultaneously sliding the tool support, and means for raising the tool support from the work on its return stroke.

8. In a gear cutting machine, the combination with means for holding the blank, of a tool operating head mounted to reciprocate toward and from the blank, a tool support mounted to slide in the head, a cam for sliding the tool support and reversible to give two opposed paths of travel to the tool support, and means for reciprocating the head.

9. In a gear cutting machine, the combination with means for holding the blank, of a tool operating head mounted to reciprocate toward and from the blank, a tool support mounted to slide in the head, a tool holder mounted to support the tool at an angle to the path of movement of the head, means for reciprocating the head, and means for simultaneously sliding the tool support.

10. In a gear cutting machine, the combination with means for holding the blank, of a tool operating head mounted to reciprocate toward and from the blank, a tool support mounted to slide in the head, a tool holder secured to said support, a tool in said holder having its cutting face inclined relative to the path of movement of said head, means for reciprocating the head, and means for simultaneously sliding the tool support.

11. In a gear cutting machine, the combination with the frame, an arbor for supporting the gear blank in operative position, means for rolling said blank on its pitch surface during the cutting operation, means for intermittently rotating the blank on its arbor, a tool operating head mounted to reciprocate substantially in a plane across the face of the blank, a tool operated by said head, and means for reciprocating the head in time with the blank rotating means, of means for causing with each reciprocation of said head a relative movement between said tool and said blank holding means transversely of the path of reciprocation of said head.

12. In a gear cutting machine, the combination with the frame, and means on the frame for supporting a gear blank and for rolling said blank on its pitch surface during the cutting operation, of a tool operating head mounted to reciprocate in a plane across the face of the blank, a tool support mounted to slide in the head, a tool secured to said support, means for reciprocating the head, and means for simultaneously sliding the tool support.

13. In a gear cutting machine, the combination with the frame, and means on the frame for supporting a gear blank and for rolling said blank on its pitch surface during the cutting operation, of a tool operating head mounted to reciprocate in a plane across the face of the blank, a tool support mounted to slide in the head, a tool secured to said support, means for reciprocating the head so that the tool traverses the face of the blank as the latter is rolled on its pitch surface, and means for sliding the tool support in time with the reciprocating movement of the head.

14. In a gear cutting machine, the combination with the frame, an arbor for supporting the gear blank in operative position, means for rolling said blank on its pitch surface during the cutting operation, and means for intermittently rotating the blank on its arbor, of a tool operating head mounted to reciprocate substantially in a plane across the face of the blank, a tool support mounted to slide in the head, a tool secured to said support, means for reciprocating the head in time with the blank rotating means, and means for simultaneously sliding the tool support.

15. In a gear cutting machine, the combination with the frame, an arbor for supporting the gear blank in operative position, means for rolling said blank on its pitch surface during the cutting operation, and means for intermittently rotating the blank on its arbor, of a tool operating head mounted to reciprocate substantially in a plane, across the face of the blank, a tool support mounted to slide in the head, a tool secured to said support, means for reciprocating the head in time with the blank rotating means, means for simultaneously sliding the tool support, and means for raising the tool from the work on its idle stroke, whereby the tool is moved transversely on its cutting and return strokes, is raised from the work on its return stroke, and the blank is rotated as the tool reciprocates in raised position on its return stroke.

16. In a gear cutting machine, the combination with means for holding the blank, of a tool operating head mounted to reciprocate toward and from the blank, a tool support mounted to slide in the head, means for reciprocating the head, and means for sliding the tool support transversely through a part only of its travel with said head.

17. In a gear cutting machine, the combination of means for supporting the blank, a cutter, means for operating the cutter in a curved path across the face of the blank, and means for simultaneously rolling the blank on its pitch surface.

18. In a gear cutting machine, the combination with means for supporting the blank, a cutter, means for producing an intermittent rotation of the blank to cause the cutter to cut on successive teeth, and means for rolling the blank relative to the cutter to generate the tooth, of means for operating the cutter in a curved path across the face of the blank, and means for positively holding the blank against all rotation on its axis, except that due to the said rolling means, during the cutting operation.

19. In a machine for cutting bevel gears, the combination with means for supporting the blank, a cutter, and means for rolling the blank on its pitch cone surface relative to the cutter to generate the tooth, of means for operating the cutter including guiding means for moving the cutter in a curved path across the face of the blank.

20. In a gear cutting machine, the combiation with means for supporting the blank, a cutter, and means for rolling the blank relative to the cutter to generate the tooth, of means for operating the cutter in a curved path on the arc of a circle across the face of the blank.

21. In a gear cutting machine, the combination of a device for supporting the blank, a cutter device, means for guiding the cutter device in a curved path across the face of the blank to cut a curved tooth, and means for moving one only of said devices to generate the tooth.

22. In a gear cutting machine, the combination of a device for supporting the blank, a cutter device, means for producing a relative movement between said devices causing the cutter device to travel in a curved path across the face of the blank to cut a curved tooth, and means for moving one only of said devices to generate the tooth.

23. In a gear cutting machine, the combination of a blank support, a cutter, means for moving the cutter in a curved path across the face of the blank tangentially of the dedendum surface, and means for producing an additional relative movement between said blank and cutter to generate the tooth.

24. A method of cutting gears consisting in moving a tool in a curved path to shape the tooth, and rolling the blank on its pitch surface to generate the tooth.

25. A method of cutting bevel gears consisting in moving a tool in a curved path to shape the tooth, and producing a relative rolling motion between the blank and the tool on the pitch cone surface of the blank to generate the tooth.

26. A method of cutting gears consisting in moving a tool in a curved path and tangentially of the blank to shape the tooth, and producing a relative motion between the blank and the tool to generate the tooth.

27. In a gear cutting machine, the combination with means for holding the blank, of a head mounted to reciprocate substantially in a plane across the face of the blank, a tool carried by said head, a cam and connections for causing with each cutting movement of said head a relative movement between the tool and the blank, transversely of the path of reciprocation of said head, and means for rolling the blank on its pitch surface during the cutting operation to generate the tooth.

28. The method of cutting bevel gears which consists in moving a tool across the face of the blank while simultaneously producing a relative lateral movement of the tool and blank during the cutting movement to effect a curved cut, and producing a relative intermittent lateral movement between the tool and blank to cut on successive teeth and a relative motion between the tool and blank to generate the tooth.

29. In a gear cutting machine, the combination with means for supporting the blank, of a cutter, means for moving the cutter across the face of the blank, means for producing a relative lateral movement between the cutter and blank during the cutting movement to effect a curved cut, means for producing a relative intermittent lateral movement between the cutter and blank to cut on successive teeth, and means for producing an additional relative movement between the cutter and blank to generate the teeth.

30. The method of forming the side face of a curved gear tooth, consisting in causing a cutter to describe a curved path across the face of the blank, and simultaneously producing relative rolling motion between the blank and cutter along the plane of the curved path of movement of the cutter.

31. The method of forming the side face of a curved gear tooth, consisting in causing a cutter to describe an arcuate path around an axis and across the face of the blank, and simultaneously producing relative rolling motion between the blank and cutter along a plane tangent to the pitch line of the blank and normal to the cutter axis.

32. In a machine for cutting curved teeth on bevel gears, the combination with a blank carrier, of a cutter having a cutting portion which is movable through the blank in a curvilinear path lengthwise of the tooth to be formed, the axis of the cutter being disposed at an angle to the axis of the blank carrier, adjusting means for changing the position of the blank carrier relatively to the cutter, means for imparting a relative rolling motion to the cutter and blank carrier, and means for advancing the cutter through the blank during said relative rolling motion.

33. In a gear cutting machine, the combination with means for supporting the blank, of a cutter, means for moving the cutter forward and back across the face of the blank, means for producing a relative lateral movement between the cutter and blank during the cutting movement to effect a curved cut, means for producing a relative intermittent lateral movement between the cutter and blank to cut on successive teeth, means for producing an additional relative movement between the cutter and blank to generate the tooth, and means for raising the cutter from the work on its back stroke.

34. In a gear cutting machine, the combination of a device for supporting the blank, a cutter device, means for guiding the cutter device in a path curved in two directions across the face of the blank to cut a curved tooth, and means for moving one of said devices to generate the tooth.

35. In a gear cutting machine, the combination of a device for supporting the blank, a cutter device, means for producing a relative movement between said devices causing the cutter device to travel in a path curved back and forth across the face of the blank to cut a curved tooth, and means for moving one of said devices to generate the tooth.

36. In a gear cutting machine, the combination of a blank support, a cutter, and means for moving the cutter in a curved path across the face of the blank and parallel to a plane tangential to the pitch surface thereof.

37. In a gear cutting machine, the combination of a blank support, a cutter, means for moving the cutter in a curved path across the face of the blank and parallel to a plane tangential to the pitch surface thereof, and means for producing an additional relative movement between said blank and cutter to generate the tooth.

38. A method of cutting gears consisting in moving a tool in a path portions of which are curved in opposite directions circumferentially of the blank to shape the tooth, and rolling the blank on its pitch surface to generate the tooth.

39. A method of cutting bevel gears consisting in moving a tool in a curved path to shape the tooth, and producing a relative rolling motion between the blank and the tool to generate the tooth.

40. A method of cutting gears consisting in moving a tool in a curved path parallel to a plane tangential to the pitch surface of the blank to shape the tooth, and producing a relative motion between the blank and the tool to generate the tooth.

41. In a machine for cutting curved gear teeth, the combination with a blank carrier, of a cutter having a cutting portion which is movable through the blank in a curvilinear path lengthwise of the tooth to be formed, the axis of the cutter being disposed at an angle to the axis of the blank carrier, adjusting means for changing the position of the blank carrier relatively to the cutter, means for imparting a relative rolling motion to the cutter and blank carrier, and means for advancing the cutter through the blank during said relative rolling motion.

42. In a gear cutting machine, the combination of means for supporting a blank, a cutter, means for operating the cutter across the face of the blank in a curved path and shifting the relation of the cutter and blank during the cutting movement in a manner to maintain uniform clearance, and means for simultaneously producing relative rolling motion between the blank and cutter along a plane tangent to the pitch line of the blank.

43. In a gear cutting machine, the combination of means for supporting the blank, a cutter, means for operating the cutter across the face of the blank in a path curved back and forth in opposite directions circumferentially of the blank and shifting the relation of the cutter and blank during the cutting movement to maintain uniform clearance, and means for simultaneously producing relative rolling motion between the blank and cutter along a plane tangent to the pitch line of the blank.

44. The method of cutting curved tooth gears, consisting in moving a tool in a curved path to shape the tooth and shifting the relation of the cutter and blank during the cutting movement to maintain uniform clearance, and producing relative rolling motion between the blank and cutter along a plane tangent to the pitch line of the blank to generate the tooth.

45. The method of cutting curved tooth gears, consisting in moving a tool in a path curved back and forth in opposite directions circumferentially of the blank to shape the tooth and shifting the relation of the cutter and blank during the cutting movement to maintain uniform clearance, and simultaneously producing relative rolling motion between the blank and cutter along a plane tangent to the pitch line of the blank to generate the tooth.

46. A gear cutting machine, comprising a cutter, means for moving said cutter in a curved path in a plane, and means for producing relative rolling motion between said cutter and a blank along the plane of the curved path of movement of the cutter.

47. A gear cutting machine, comprising a cutter, means for moving said cutter in a curved path in a plane, and means for rolling a blank along the plane of the curved path of movement of said cutter.

48. A gear cutting machine, comprising a cutter, means for moving said cutter in a curved path in a plane, means for rolling a blank along said plane, and means for relatively rotating said blank and cutter step by step around the blank axis.

In testimony whereof I affix my signature in presence of two witnesses.

CHARLES E. DERR.

Witnesses:
  Milo L. Bailey,
  E. Groat.